US008241555B2

(12) United States Patent
Ogura

(10) Patent No.: US 8,241,555 B2
(45) Date of Patent: Aug. 14, 2012

(54) METHOD FOR MANUFACTURING A HONEYCOMB STRUCTURE

(75) Inventor: Yutaka Ogura, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 394 days.

(21) Appl. No.: 12/481,935

(22) Filed: Jun. 10, 2009

(65) Prior Publication Data

US 2009/0321999 A1 Dec. 31, 2009

(30) Foreign Application Priority Data

Jun. 25, 2008 (JP) ................................ 2008-165597

(51) Int. Cl.
*C04B 33/32* (2006.01)

(52) U.S. Cl. ....................................................... 264/630

(58) Field of Classification Search .................. 264/630, 264/631, 605–609, 671–672
See application file for complete search history.

(56) References Cited

U.S. PATENT DOCUMENTS

2005/0166729 A1 8/2005 Nishio et al.
2006/0029769 A1* 2/2006 Ichikawa et al. .............. 428/116
2006/0292331 A1 12/2006 Ohno et al.
2008/0203626 A1* 8/2008 Ohno et al. ................... 264/630
2009/0217524 A1* 9/2009 Domey et al. ................... 29/890
2009/0246452 A1* 10/2009 Ogura et al. .................. 428/116

FOREIGN PATENT DOCUMENTS

EP 2 151 553 A1 2/2010
JP A-2003-291054 10/2003

OTHER PUBLICATIONS

Apr. 23, 2012 European Search Report in EP Appln. No. EP 09 25 1553.5.

* cited by examiner

*Primary Examiner* — Matthew J. Daniels
*Assistant Examiner* — Erin Snelting
(74) *Attorney, Agent, or Firm* — Oliff & Berridge, PLC

(57) ABSTRACT

A method for manufacturing a honeycomb structure 130 includes: subjecting a forming raw material to extrusion forming to obtain a segment-joined type honeycomb formed article 100 provided with honeycomb segments 1 and an outer peripheral portion 2 surrounding a whole outermost periphery of the honeycomb segments, wherein a slit-shaped gap 8 extending from one end face 11 to the other end face 12 is formed between adjacent segments, the adjacent honeycomb segments are joined by a belt-like joining rib 4 extending from the face 11 to the face 12 and having a thickness of 0.1 to 1.5 mm, and the honeycomb segments 1 have partition walls separating and forming cells; firing the honeycomb formed article 100 to form a honeycomb fired article 110; destroying the joining rib 4 in the honeycomb fired article 110; and forming a buffer portion 7 by filling a bonding material in the gap 3.

12 Claims, 6 Drawing Sheets

[FIG. 1]
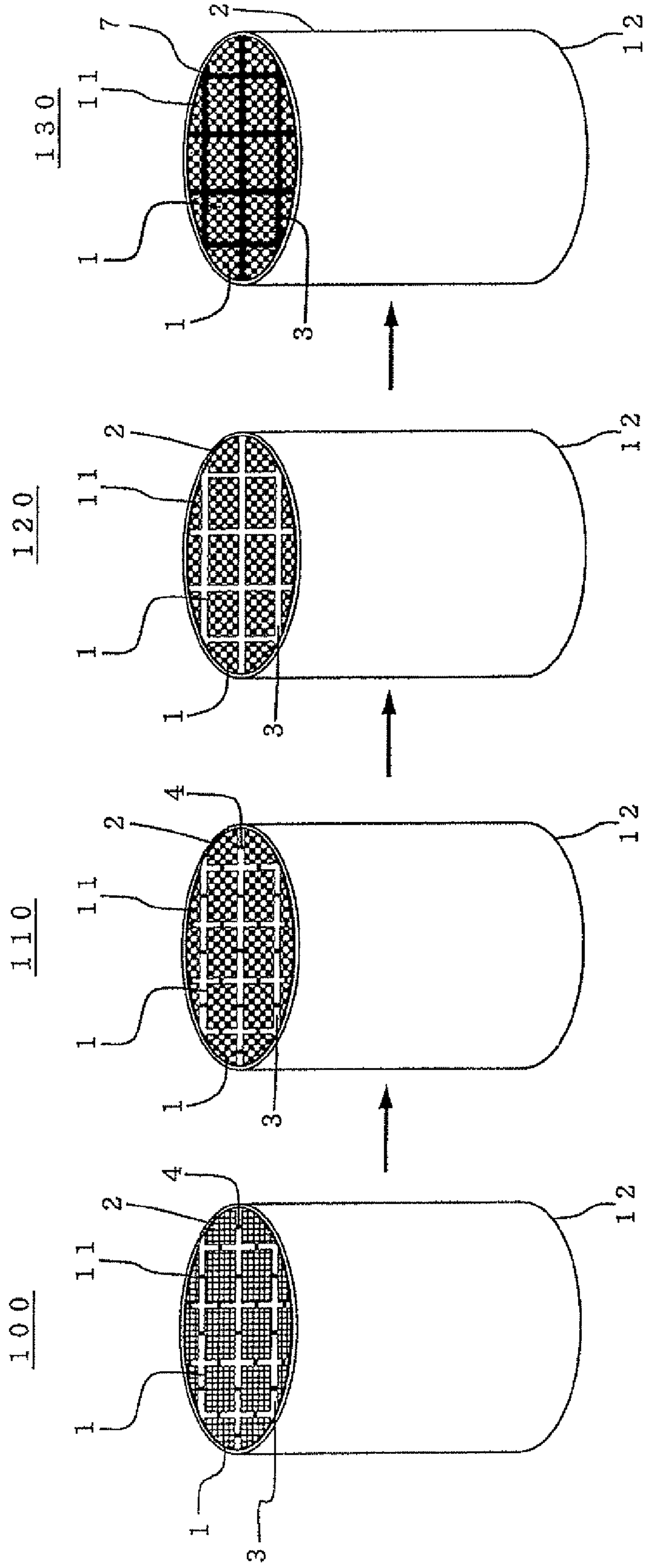

[FIG. 2]
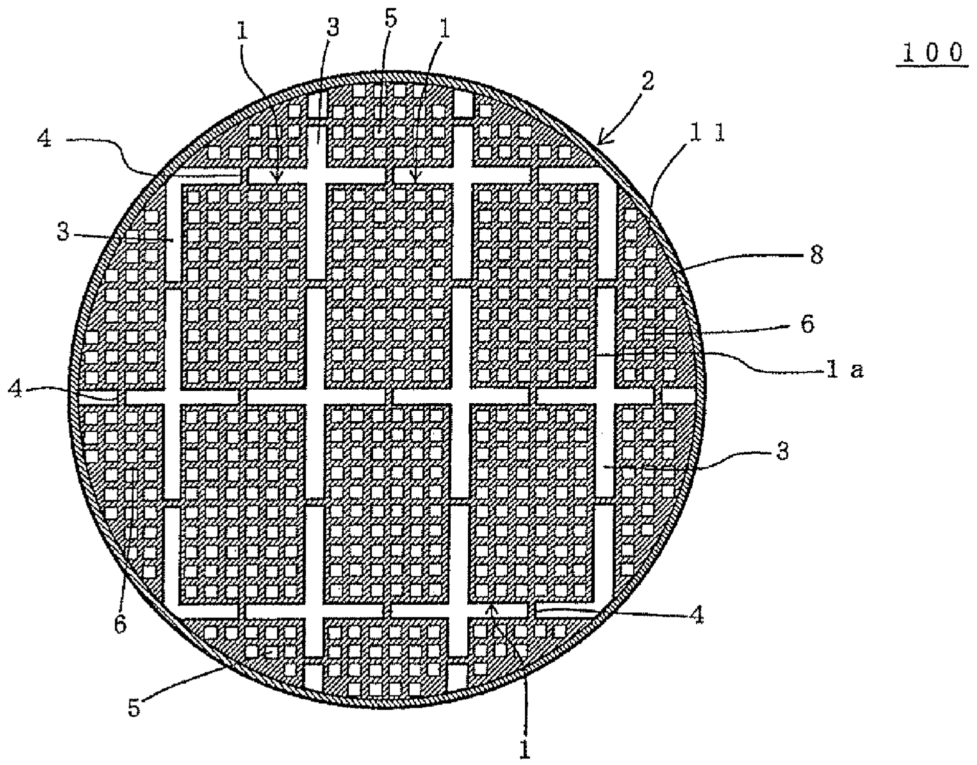
[FIG. 3A]
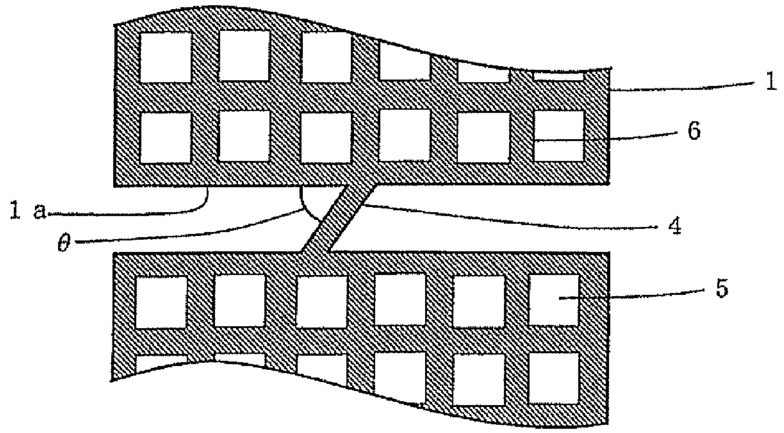

[FIG. 3B]
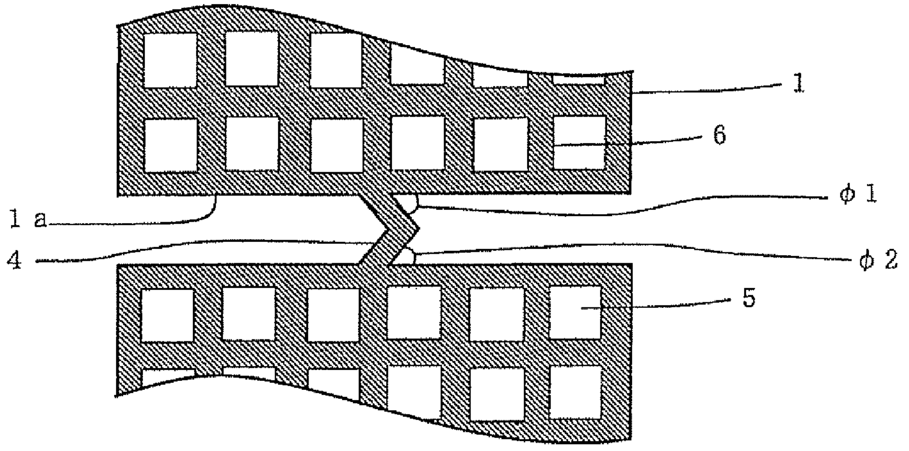
[FIG. 4A]
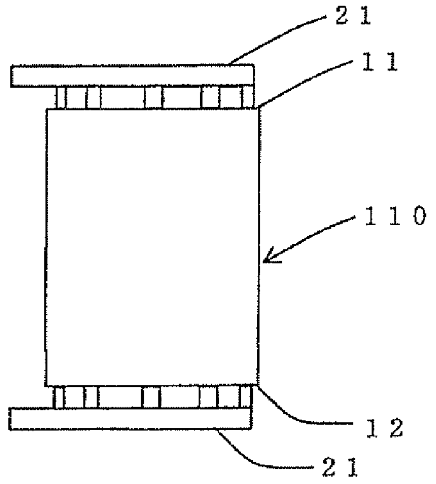
[FIG. 4B]
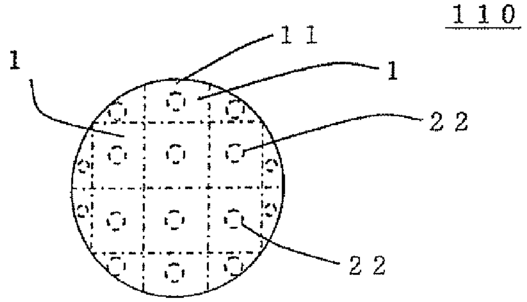

[FIG. 5]
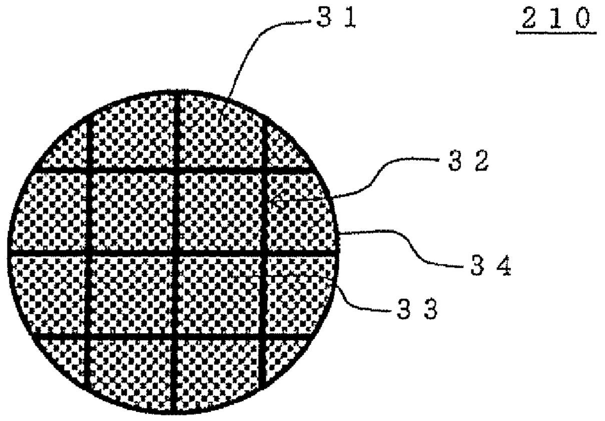
[FIG. 6]
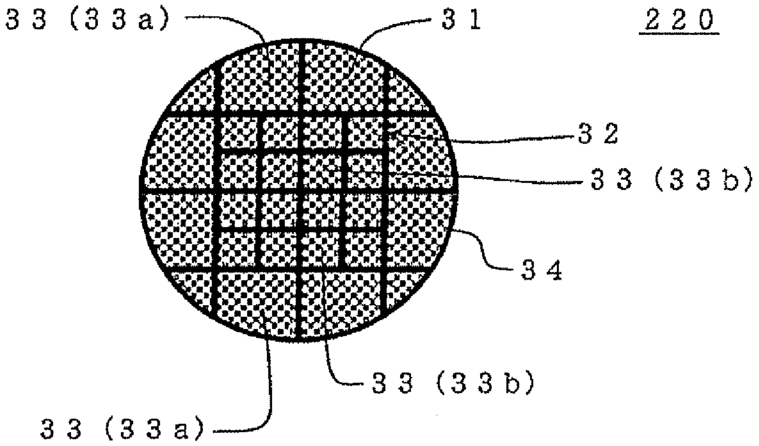
[FIG. 7]
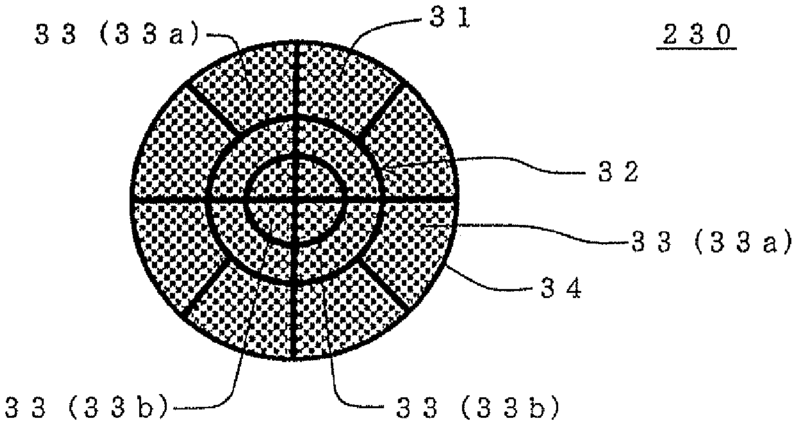

[FIG. 8]
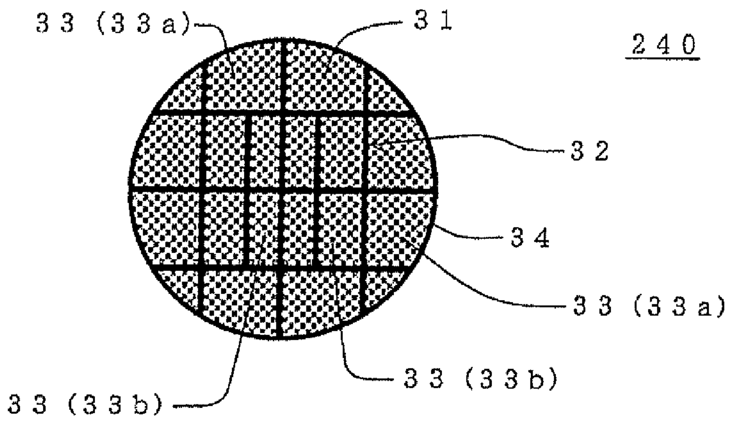
[FIG. 9]
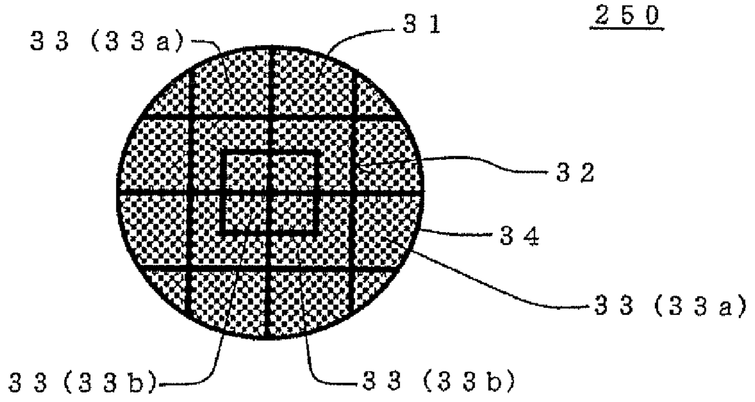
[FIG. 10]
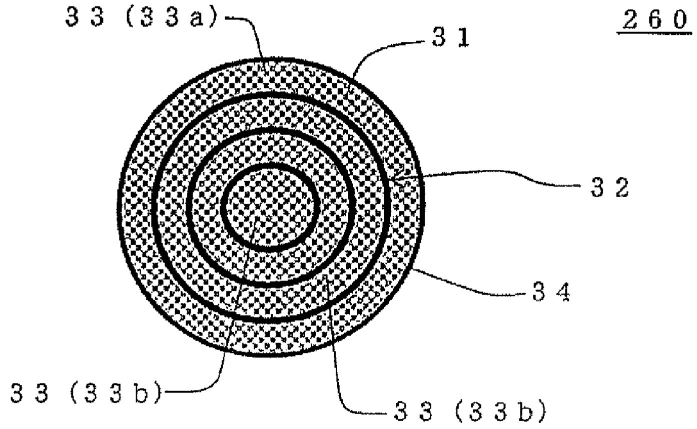

[FIG. 11]
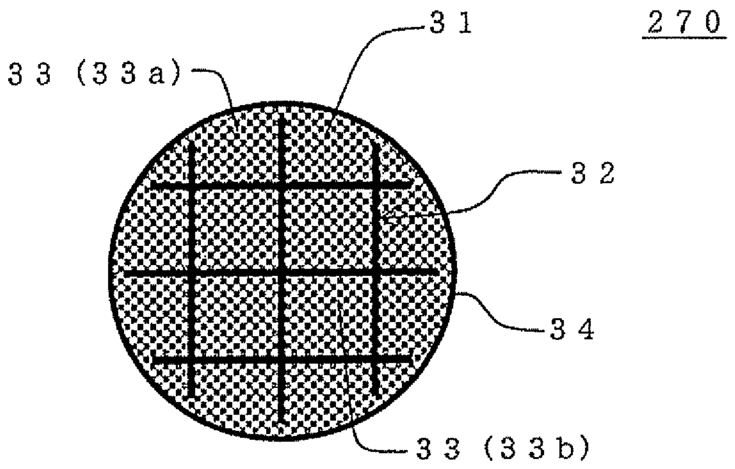

METHOD FOR MANUFACTURING A HONEYCOMB STRUCTURE

BACKGROUND OF THE INVENTION AND RELATED ART STATEMENT

The present invention relates to a method for manufacturing a honeycomb structure. More specifically, the present invention relates to a method for manufacturing a honeycomb structure, the method being capable of improving production efficiency and raw material yield.

In various fields such as chemistry, electric power, and iron and steel, there has been employed a ceramic honeycomb structure excellent in thermal resistance and corrosion resistance as a carrier of a filter for catalyst apparatus used for environmental measures, collection of a specific substance, or the like. In particular, recently, the honeycomb structure has extensively been used as a diesel particulate filter (DPF) for trapping particulate matter (PM) discharged from a diesel engine and the like by alternately plugging opening portions of cells on both the end faces to obtain a plugged honeycomb structure. In addition, as materials for a honeycomb structure used at high temperature in a corrosive gas atmosphere, silicon carbide (SiC), cordierite, aluminum titanate (AT), and the like have suitably been employed because of excellent thermal resistance and chemical stability.

Since silicon carbide has relatively high thermal expansion coefficient, a large honeycomb structure formed by using silicon carbide as a framework may have a defect by a thermal shock upon being used. In addition, it may have a defect by a thermal shock when trapped particulate matter is combusted and removed. Therefore, regarding a honeycomb structure formed by using silicon carbide as a framework, in the case of manufacturing a honeycomb structure having a predetermined or larger size, small segments for a plugged honeycomb structure are generally manufactured, the segments are bonded together to obtain one large bonded article, and the outer periphery of the bonded article is subjected to rough processing and grinding to obtain a plugged honeycomb structure having a desired shape such as a cylindrical shape (see JP-A-2003-291054). Incidentally, a bonding material is used for bonding of the segments. The bonding material is applied on a side face of predetermined segments to bond a plurality of segments at their side faces.

When a honeycomb structure having a desired shape is manufactured by such a method, after manufacturing one large rectangular parallelepiped bonded article by bonding a plurality of rectangular parallelepiped segments, it is generally necessary to subject the outer periphery to rough processing to obtain an almost desired shape and further subject it to grinding to obtain a honeycomb structure having a desired shape with high precision. Therefore, extra steps such as a rough processing step of the outer periphery, a grinding step, and the like are necessary. In addition, since the outer periphery is subjected to rough processing and grinding, there arises a problem of low raw material yield.

SUMMARY OF THE INVENTION

The present invention has been made in view of the aforementioned problems and aims to provide a method for manufacturing a honeycomb structure, the method being capable of improving production efficiency and raw material yield.

In order to solve the aforementioned problems, the present invention provides the following method for manufacturing a honeycomb structure.

[1] A method for manufacturing a honeycomb structure comprising the steps of: subjecting a forming raw material to extrusion forming to obtain a segment-joined type honeycomb formed article provided with a plurality of honeycomb segments extending from one end face to the other end face and an outer peripheral portion surrounding a whole outermost periphery of the plurality of honeycomb segments, wherein a slit-shaped gap extending from one end face to the other end face is formed between adjacent segments, the adjacent honeycomb segments are joined by a belt-like joining rib extending from one end face to the other end face and having a thickness of 0.1 to 1.5 mm, and the honeycomb segments have partition walls separating and forming a plurality of cells extending from one end face to the other end face and functioning as fluid passages; firing the honeycomb formed article to form a honeycomb fired article; destroying the joining rib in the honeycomb fired article; and forming a buffer portion by filling a bonding material in the gap.

[2] A method for manufacturing a honeycomb structure according to [1], wherein plugging portions are formed in opening end portions on one side of predetermined cells and opening end portions on the other side of the remaining cells of each of the honeycomb segments of the honeycomb formed article, followed by firing the honeycomb segments.

[3] A method for manufacturing a honeycomb structure according to [1], wherein, after the honeycomb formed article is fired, plugging portions are formed in opening end portions on one side of predetermined cells and opening end portions on the other side of the remaining cells of each of the honeycomb segments of the honeycomb formed article.

[4] A method for manufacturing a honeycomb structure according to any one of [1] to [3], wherein, a part of the joining rib is destroyed with firing the honeycomb formed article, and then the remaining part of the joining rib of the honeycomb fired article is destroyed.

[5] A method for manufacturing a honeycomb structure according to any one of [1] to [4], wherein, the honeycomb segment after firing has a thermal expansion coefficient of $1\times10^{-6}$/° C. or more.

According to a method for manufacturing a honeycomb structure of the present invention, since a honeycomb structure is manufactured by extrusion forming a segment-joined type honeycomb formed article, destroying a joining rib joining the segments, and filling a filler between the segments (in a gap) to form a buffer portion, rough processing for the outer periphery is not necessary, and therefore, the production efficiency can be improved, and the raw material yield can be improved to a large extent.

BRIEF DESCRIPTION OF THE DRAWINGS

FIG. 1 is a perspective view schematically showing a process of forming a honeycomb structure in one embodiment of a method for manufacturing a honeycomb structure of the present invention.

FIG. 2 is a plan view of a honeycomb formed article shown in FIG. 1 viewed from one end face side.

FIG. 3A is a schematic view showing a part of a cross section perpendicular to the central axis of a honeycomb formed article obtained at an intermediate stage in another embodiment of a method for manufacturing a honeycomb structure of the present invention and showing a state that honeycomb segments are joined with a joining rib.

FIG. 3B is a schematic view showing a part of a cross section perpendicular to the central axis of a honeycomb formed article obtained at an intermediate stage in another embodiment of a method for manufacturing a honeycomb structure of the present invention and showing a state that honeycomb segments are joined with a joining rib.

FIG. 4A is a side view schematically showing a state where a honeycomb fired article is held at both the end faces thereof by a vibration jig.

FIG. 4B is a plan view schematically showing a honeycomb fired article viewed from one end face side, showing a part where the vibration jib abuts on one end face.

FIG. 5 is a plan view viewed from one end face side, schematically showing a honeycomb fired article manufactured by another embodiment of a method for manufacturing a honeycomb structure of the present invention.

FIG. 6 is a plan view viewed from one end face side, schematically showing a honeycomb structure manufactured by another embodiment of a method for manufacturing a honeycomb structure of the present invention.

FIG. 7 is a plan view viewed from one end face side, schematically showing a honeycomb structure manufactured by another embodiment of a method for manufacturing a honeycomb structure of the present invention.

FIG. 8 is a plan view viewed from one end face side, schematically showing a honeycomb structure manufactured by another embodiment of a method for manufacturing a honeycomb structure of the present invention.

FIG. 9 is a plan view viewed from one end face side, schematically showing a honeycomb structure manufactured by another embodiment of a method for manufacturing a honeycomb structure of the present invention.

FIG. 10 is a plan view viewed from one end face side, schematically showing a honeycomb structure manufactured by another embodiment of a method for manufacturing a honeycomb structure of the present invention.

FIG. 11 is a plan view viewed from one end face side, schematically showing a honeycomb structure manufactured by another embodiment of a method for manufacturing a honeycomb structure of the present invention.

REFERENCE NUMERALS

1, 33: honeycomb segment, 1*a*: side face of honeycomb segment, 2, 34: outer peripheral portion, 3: gap, 4: joining rib, 5: cell, 6: partition wall, 7, 32: buffer portion, 8: outermost periphery of honeycomb segments, 11, 31: one end face, 12: the other end face, 21: vibration jig, 22: portion where a vibration jig abuts, 33*a*: honeycomb segment in contact with outer peripheral portion, 33*b*: honeycomb segment located in central portion, 100: honeycomb formed article, 110: honeycomb fired article, 120: joint cancelled honeycomb fired article, 130: honeycomb structure, θ: angle at which joining rib and side face of honeycomb segment intersect each other, ϕ1: angle at which joining rib and one honeycomb segment intersect each other, ϕ2: angle at which joining rib and the other honeycomb segment intersect each other

DETAILED DESCRIPTION OF THE INVENTION

Next, the best embodiments for carrying out the present invention will be described in detail with referring to drawings. However, the present invention is by no means limited to the following embodiments, and it should be understood that changes, improvements, and the like of the design may suitably be added on the basis of general knowledge of a person of ordinary skill within the range of not deviating from the gist of the present invention.

As shown in FIGS. 1 and 2, one embodiment of a method for manufacturing a honeycomb structure of the present invention is a method for manufacturing a honeycomb structure 130 including the steps of: subjecting a forming raw material to extrusion forming to obtain a segment-joined type honeycomb formed article 100 provided with a plurality of honeycomb segments 1 extending from one end face 11 to the other end face 12 and an outer peripheral portion 2 surrounding the whole outermost periphery of the plurality of honeycomb segments 1, wherein a slit-shaped gap 3 extending from one end face 11 to the other end face 12 is formed between adjacent segments 1, the adjacent honeycomb segments 1 are joined by a belt-like joining rib 4 extending from one end face 11 to the other end face 12 and having a thickness of 0.1 to 1.5 mm, and the honeycomb segments 1 have partition walls 6 separating and forming a plurality of cells 5 extending from one end face to the other end face and functioning as fluid passages; forming plugging portions in opening end portions on one side of predetermined cells and opening end portions on the other side of the remaining cells, the predetermined cells and the remaining cells being alternately arranged each of the honeycomb segments of the honeycomb formed article 100; firing the honeycomb formed article 100 to form a honeycomb fired article 110; destroying the joining rib 4 in the honeycomb fired article 110 to form a joint cancelled honeycomb fired article 120; and forming a buffer portion 7 by filling a bonding material in the gap 3. FIG. 1 is a perspective view schematically showing a process of forming a honeycomb structure in one embodiment of a method for manufacturing a honeycomb structure of the present invention, and FIG. 2 is a plan view of a honeycomb formed article 100 shown in FIG. 1 viewed from one end face side. Incidentally, in a method for manufacturing a honeycomb structure of the present embodiment, after plugging portions are formed in the cells of each honeycomb segment 1 of the honeycomb formed article 100, the honeycomb formed article 100 is fired to obtain a honeycomb fired article 110. However, a honeycomb fired article 110 may be obtained by forming plugging portions in the cells of each honeycomb segment 1 after the honeycomb formed article 100 is fired. In addition, in the case of performing plugging after firing the honeycomb formed article 100, after plugging portions are formed, the honeycomb fired article 110 may be fired again in order to fire the plugging portions.

In the case of manufacturing a large cylindrical honeycomb structure with a material having high thermal expansion coefficient such as silicon carbide, it is generally required to obtain a cylindrical honeycomb structure by, after manufacturing a large rectangular parallelepiped bonded article by bonding a plurality of rectangular parallelepiped segments, subjecting the outer periphery to rough processing using an apparatus such as a bead saw and grinding (grinding processing) using a cam grinding machine or the like in order to prevent the honeycomb structure from being damaged due to a thermal shock at high temperature. Therefore, extra steps such as the rough processing step for the outer peripheral portion are required. In addition, since the outer periphery is subjected to rough processing, the raw material yield is not high. In contrast, since a segment-joined type honeycomb formed article whose whole shape is a desired shape (cylindrical shape) is extrusion formed in a method for manufacturing a honeycomb structure of the present embodiment, the method has neither the step of bonding rectangular parallelepiped segments nor the step of rough processing the outer peripheral portion. Therefore, the method provides high production efficiency and very high raw material yield. Here, "rough processing" means that a bonded article in the shape of a rectangular parallelepiped is processed to obtain a shape close to a desired shape by grinding the outer periphery. In addition, "grinding" means that the bonded article is finished with high precision so that the bonded article may have a predetermined shape and predetermined surface smoothness by further fringing the outer periphery of the bonded article after rough processing. Description will hereinbelow be given step by step.

(1) Manufacture of Honeycomb Formed Article:

In the first place, to a ceramic raw material were added a binder, a surfactant, a pore former, water, and the like to prepare a forming raw material. The ceramic raw material is preferably at least one selected from the group consisting of silicon carbide, silicon-silicon carbide based composite material, cordierite, mullite, alumina, spinel, silicon carbide-cordierite based composite material, lithium aluminum silicate, aluminum titanate, and iron-chrome-aluminum based alloy. Of these, silicon carbide or silicon-silicon carbide based composite material is preferable. In the case of using silicon-silicon carbide based composite material, a mixture of a silicon carbide powder and a metal silicon powder is used as the ceramic raw material. The content of the ceramic raw material is preferably 70 to 94 mass % with respect to the whole forming raw material.

Examples of the binder include methyl cellulose, hydroxypropoxyl cellulose, hydroxyethyl cellulose, carboxymethyl cellulose, and polyvinyl alcohol. Of these, it is preferable to use methyl cellulose and hydroxypropoxyl cellulose together. The content of the binder is preferably 1 to 20 mass % with respect to the whole forming raw material.

The water content is preferably 18 to 45 mass % with respect to the whole forming raw material.

Examples of the surfactant include ethylene glycol, dextrin, fatty acid soap, and polyalcohol. They may be used alone or in combination of two or more. The content of the surfactant is preferably 5 mass % or less with respect to the whole forming raw material.

There is no particular limitation on the pore former as long as it becomes a pore after firing, and examples of the pore former include starch, a resin balloon, water-absorbing resin, and silica gel. The content of the pore former is preferably 15 mass % or less with respect to the whole forming raw material.

Next, the forming raw material is kneaded to form kneaded clay. There is no particular limitation on the method for forming kneaded clay by kneading the forming raw material, and, for example, a method using a kneader, a vacuum kneader, or the like, may be employed.

Next, the kneaded clay is subjected to extrusion forming to form a honeycomb formed article. Upon extrusion forming, it is preferable to use a die having desired segment shape, disposition of segments, joining rib shape, cell shape, partition wall thickness, cell density, and the like. As the material for the die, superhard alloy which hardly abrades is preferable. The honeycomb formed article 100 is a joining type honeycomb formed article provided with a plurality of honeycomb segments 1 joined with a joining rib 4 and an outer peripheral portion 2 surrounding the whole outermost periphery of the honeycomb segments 1.

The area of the cross-section perpendicular to the central axial direction of the honeycomb formed article 110 is preferably within the range of 19 to 1590 $cm^2$. Since a method for manufacturing a honeycomb structure of the present invention can manufacture a honeycomb structure having high thermal shock resistance, the method is suitable for manufacturing such a honeycomb structure having a large cross section. The number of honeycomb segments 1 disposed in a cross section perpendicular to the central axial direction of the honeycomb formed article 100 is preferably 4 to 144, more preferably 16 to 100. As the size of the honeycomb segment 1, the area of the cross section perpendicular to the central axis is preferably 3 to 16 $cm^2$, more preferable 7 to 13 $cm^2$. When it is smaller than 3 $cm^2$, pressure loss when gas circulates in the honeycomb structure may be large. When it is larger than 16 $cm^2$, an effect of inhibiting the honeycomb segment from being damaged may be reduced.

The number of the joining ribs formed between the adjacent honeycomb segments (the number for every adjacent honeycomb segment) is 1 to 3, more preferably 1 to 2. When it is below 1, the segments may fall apart upon forming. When it is above 3, the joining ribs may hardly be destroyed.

Though the joining rib 4 may be disposed to be perpendicular to a side face of a honeycomb segment 1 as shown in FIG. 2, it is preferable that, as shown in FIG. 3A, the joining rib 4 is disposed in such a manner that the joining rib 4 is obliquely joined with the side face 1*a* of the honeycomb segment. The angle (acute angle) θ formed by the joining rib 4 and the side face 1*a* of the honeycomb segment is preferably 20 to 70°, more preferably 40 to 60°. By adjusting the angle θ formed by the joining rib 4 and the side face 1*a* in this range, the joining rib can be destroyed more easily. When it is below 20°, the joining state of the honeycomb segment is unstable, and deformation of the honeycomb formed article may easily be caused. When it is above 70°, the effect of making destruction of the joining rib easy may hardly be exhibited. In addition, as shown in FIG. 3B, it is also preferable that the joining rib 4 has a shape obtained by folding a linear shape at the central portion in a cross section perpendicular to the central axis (a shape obtained by joining two straight lines in two different directions at the central portion). Here, the central portion in the joining rib 4 means a range of ±10% of the joining rib 4 length from the center in the longitudinal direction of the joining rib 4 in the cross section perpendicular to the central axis. This formation makes destruction of the joining rib easier. The angle θ1 (acute angle) formed by the joining rib and a honeycomb segment on one side is 20 to 70°, more preferably 40 to 60°. In addition, the angle θ2 (acute angle) formed by the joining rib and a honeycomb segment on the other side is 20 to 70°, more preferably 40 to 60°. It is also preferable that the joining rib has a curved shape as an arc in a cross section perpendicular to the central axis. Such a shape makes destruction of the joining rib easier. FIG. 3A is a schematic view showing a part of a cross section perpendicular to the central axis of a honeycomb formed article obtained at an intermediate stage in another embodiment of a method for manufacturing a honeycomb structure of the present invention and showing a state that honeycomb segments are bonded joined with a joining rib. FIG. 3B is a schematic view showing a part of a cross section perpendicular to the central axis of a honeycomb formed article obtained at an intermediate stage in another embodiment of a method for manufacturing a honeycomb structure of the present invention and showing a state that honeycomb segments are joined with a joining rib.

The joining rib has a thickness of 0.1 to 1.5 mm. When it is below 0.1 mm, the joining rib deforms before drying to cause deformation of the formed article, which is not preferable. When it is above 1.5 mm, it makes destruction of the joining rib difficult, which is not preferable. As shown in FIG. 2, in the case that the joining rib 4 and the side face 1*a* of the honeycomb segment are mutually perpendicular, the joining rib thickness is preferably 0.1 to 0.5 mm. In addition, as shown in FIG. 3A, in the case that the joining rib 4 obliquely joined with the side face 1*a* of the honeycomb segment, the joining rib thickness is preferably 0.1 to 1.0 mm. As shown in FIG. 3B, in the case that the joining rib 4 has a shape obtained by being folded at the central portion in a cross section perpendicular to the central axis, the joining rib thickness is 0.1 to 1.5 mm.

The gap thickness (distance (interval) between adjacent honeycomb structures) is preferably 0.3 to 3.0 mm, more preferably 1.0 to 1.5 mm. When it is below 0.3 mm, the thickness of the buffer portion of the resultant honeycomb structure is small to sometimes lowers thermal shock resistance. When it is above 3.0 mm, the thickness of the buffer portion of the resultant honeycomb structure is thick to sometimes increase pressure loss.

The outer peripheral portion 2 surrounds the whole outermost periphery 8 of a plurality of honeycomb segments, and the whole portions of the outermost periphery of the honeycomb segment is covered with the outer peripheral portion 2. That is, neither a hole nor a slit is formed in the outer peripheral portion 2. "The outer peripheral portion 2 surrounds the whole outermost periphery 8 of a plurality of honeycomb segments" means a state that the outer peripheral portion surrounds the honeycomb segments so as to cover the outermost periphery (side faces toward outside of the honeycomb segments located on the outermost side (honeycomb segments constituting the outermost periphery)) of the joined honeycomb segments and the opening portions opening in the outermost periphery of the gaps formed between the honeycomb segments constituting the outermost periphery. Incidentally, in the case that the honeycomb segments constituting the outermost periphery are not separated from each other by the gap portions not to form openings of the gaps in the outermost periphery, only one honeycomb segment locates on the outermost side (see FIG. 10) and the side face toward outside of the honeycomb segment locating on the outermost side corresponds with the "outermost periphery of a plurality of honeycomb segments".

In the honeycomb formed article, the partition wall thickness, cell density, outer peripheral portion thickness, and the like can suitably be determined according to the structure of the honeycomb structure to be manufactured in consideration of shrinkage in drying and firing.

The obtained honeycomb formed article is preferably dried before firing. There is no particular limitation on the drying method, and examples of the method include an electromagnetic wave heating method such as microwave heat-drying and high frequency dielectric heat-drying and an external heating method such as hot air drying and superheated steam drying. Of these, it is preferable that, after a certain amount of water is dried by an electromagnetic wave, the remaining water is dried by an external heating method. As the drying conditions, it is preferable that, after 30 to 90 mass % of water with respect to the water amount before drying is removed by an electromagnetic heating method, water amount is reduced to 3 mass % or less by an external heating method. As the electromagnetic heating method, dielectric heat-drying is preferable. As the external heating method, hot air drying is preferable.

Next, in the case that the length of the honeycomb formed article in the central axial direction is not the desired length, it is preferable to cut both the end faces (both the end portions) to have desired length. Though there is no particular limitation on a cutting method, there may be employed a method using a disc saw cutter or the like.

Next, it is preferable to form plugging portions in opening portions of predetermined cells in one end face and opening portions of the other cells in the other end face of the honeycomb formed article to obtain a plugging honeycomb forming article. It is more preferable that the predetermined cells and the remaining cells are alternately arranged. In the case of forming a plugged honeycomb article, the honeycomb structure obtained serves as a plugged honeycomb structure. Though there is no particular limitation on a method for forming plugging portions, for example, the following method may be employed. After applying a sheet on one end face of a honeycomb formed article, holes are made in positions corresponding with the cells where plugging portions are to be formed of the sheet. Then, the end face where the sheet is applied of the honeycomb formed article is immersed in plugging slurry prepared by slurrying constituent material for the plugging portions to fill the plugging slurry in the open end portions of the cells where the plugging portions are to be formed through the holes made in the sheet. In addition, regarding the other end face of the honeycomb formed article, plugging portions are formed (plugging slurry is filled) in the same manner as in the aforementioned method where the plugging portions were formed on one end face. As the constituent material for the plugging portions, it is preferable to use the same material as that for the honeycomb formed article.

The plugging portions may be formed after the honeycomb formed article is fired. In this case, it is preferable that the method for forming the plugging portions is the same as the aforementioned method for forming the plugging portions in the honeycomb formed article.

(2) Manufacture of Honeycomb Fired Article:

Next, it is preferable to fire a honeycomb formed article 100 or a plugged honeycomb formed article to manufacture a honeycomb fired article 110 or a plugged honeycomb fired article. It is preferable to perform calcination before firing in order to remove a binder or the like. The calcination is preferably performed at 400 to 500° C. for 0.5 to 20 hours. There is no particular limitation on the methods of calcination and firing, and firing can be performed by the use of an electric furnace, a gas furnace, or the like. The firing is preferably performed in an inert atmosphere such as nitrogen and argon at 1300 to 1500° C. for 1 to 20 hours. A part of the joining rib may be destroyed upon firing (while firing). In order to destroy a part of the joining rib, the number of the joining ribs formed between adjacent honeycomb segments (number for each adjacent honeycomb segment) is preferably one or two, and the joining rib thickness is preferably 0.1 to 0.5 mm. When it is larger than 0.5 mm, sometimes the joining rib cannot be destroyed upon firing.

(3) Manufacture of Joint Cancelled Honeycomb Fired Article:

Next, the joining ribs of the honeycomb fired article 110 are destroyed to manufacture a joint cancelled honeycomb fired article 120. The method for destroying the joining ribs is not particularly limited. As a preferable example, as shown in FIGS. 4A and 4B, a honeycomb fired article 110 is held with a vibration jig 21 at both the end faces 11 and 12, and the honeycomb fired article 110 is vibrated by the vibration jig 21 to destroy the joining ribs 4. When the honeycomb fired article 110 is held with a vibration jig 21, it is preferable that each segment 1 is held at both the end faces with a vibration jig 21 to obtain a state that all the honeycomb segments are held with the vibration jig 21. Thus, by holding and vibrating all the honeycomb segments 1 by the vibration jig 21, not only the joining rib 4 can effectively be destroyed, but also the honeycomb segments are not separated from each other after the joining ribs 4 are destroyed, and the same positions of the segments as in the case of having the joining ribs 4 can be maintained. In this state, the buffer portions can easily be formed, and production efficiency can be improved. FIG. 4A is a side view schematically showing a state where a honeycomb fired article 110 is held at both the end faces 11, 12 thereof by a vibration jig 21. FIG. 4B is a plan view schematically showing a honeycomb fired article 110 viewed from one end face 11 side, showing apart 22 where the vibration jib 21 abuts on one end face 11.

When a honeycomb fired article is vibrated by a vibration jig 21, it is preferable that the vibration jig is vibrated in such a manner that the honeycomb segments are reciprocated in parallel with an end face of the honeycomb fired article. The amplitude of vibration is preferably 0.01 to 10 mm. The material of portions abutting against the honeycomb segments 1 of the vibration jig 21 is preferably rubber of the like.

As a method for destroying the joining ribs without using the vibration jig, there may be employed a method of slightly hitting the joining ribs with a hammer or the like to destroy only the joining ribs.

(4) Manufacture of Honeycomb Structure:

A buffer portion 7 is formed by filling a bonding material into the gap 3 formed between adjacent honeycomb segments of the joint cancelled honeycomb fired article 120 to obtain a honeycomb structure 130. The buffer portion 7 is preferably formed in the whole gap. The buffer portion 7 plays a role of buffering (absorbing) volume change when the honeycomb segments have thermal expansion or thermal shrinkage and a role of bonding the honeycomb segments. Therefore, the sentence, "a buffer portion is formed in the gap," means that "adjacent honeycomb segments are bonded by means of a buffer portion." As a method for forming the buffer portion 7, there is a method where slurry prepared by dispersing a filler in a dispersion medium such as water is filled into a slit since the gas is maintained with a fixed thickness (width) by the vibration jib 21 even after the joining rib is destroyed in the case of the state that the honeycomb fired article 110 is held with a vibration jig 21 as shown in FIG. 4A. At this time, the thickness of the gap maintained by the vibration jig 21 is the thickness of the buffer portion 7. When the slurry is filled into the gap, it is preferable that the honeycomb fired article 120 fixed with the vibration jig is put in a sealed container and that a tape or the like is wrapped around the outer periphery lest the slurry should leak from the outer periphery. When the joint cancelled honeycomb fired article 120 is large, by filling the slurry from a plurality of positions, the slurry can be filled without applying high-pressure. As the material for the tape wrapped around the outer periphery of the joint cancelled honeycomb tired article 120, an impermeable material such as polyester may be used. In this case, when the slurry is filled in the state that the joint cancelled honeycomb fired article 120 is stationary, there is a case that the slurry does not spread uniformly in the gap because a dispersion medium is absorbed by the partition walls in the case that the joint cancelled honeycomb fired article 120 is porous. Therefore, in such a case, it is preferable to press slurry into the gap with vibrating the joint cancelled honeycomb fired article 120 with a vibration apparatus. As the vibration apparatus, for example, Kogata Shindo Shikennki (trade name) (meaning small-sized vibration tester) produced by Asahifactory Corporation can be used. In addition, vibrations may be applied by the vibrating jig without using a vibration apparatus. In addition, in order to uniformly fill the slurry into the gap easily, it is preferable to subject the inner walls (outer peripheral wall of the honeycomb segment) of the gap to a water repellent treatment. As the water repellent treatment, a method where slurry containing SiC particles is sprayed can be employed. After pressing the slurry into the gap, it is preferable to dry the slurry at 100° C. or more.

Further, as a method for forming the buffer portion 7 in the case of using the vibration jig 21, there may be employed a method where the filler is formed into a tape shape, a plurality of tape shaped fillers are filled into the gap and then subjected to a heating treatment to obtain the buffer portion 7. There is no particular limitation on the method for forming the filler into a tape shape, and, for example, there can be employed a method where a forming raw material prepared by mixing a filler, a binder, a surfactant, water, and the like is formed into a tape shape by a tape-forming method. In addition, as a method for forming a buffer portion 7, there may be employed a method where a powdered filler is filled into the gap, followed by sealing the opening portion of the gap by cement, an adhesive, or the like to obtain the buffer portion 7. The powdered filler can be filled into the gap by tapping.

In addition, in the case that the rib is destroyed without using the vibration jig 21 and that the honeycomb segments are separated from one another, there may be employed a method where slurry prepared by dispersing the filler in the dispersion medium is applied on a bonding face of each segment and the outer peripheral portion, or the aforementioned tape shaped filler is bonded on a bonding face, and then, the honeycomb segments and the outer peripheral portion are bonded. This enables to obtain a honeycomb structure where the buffer portion 7 is formed in the gap formed between adjacent honeycomb segments.

As the filler, there may be employed slurry prepared by adding water to inorganic fibers, colloidal silica, clay, SiC particles, an organic binder, a resin balloon, and a dispersant, and kneading them. In the case that a filler is formed into a tape shape and inserted into a slit, it is preferable that a material foamable by a thermal treatment is used and that, after the filler is inserted into the gap, the joint cancelled honeycomb fired article is heated. As a material foamable by a thermal treatment, an urethane resin may be employed.

(5) Outer Peripheral Coat Treatment:

It is preferable to perform an outer peripheral coat treatment after the honeycomb structure is formed. By performing the outer peripheral coat treatment, the unevenness of the outer peripheral face of the outer peripheral portion can be reduced. As the outer peripheral coat treatment, there may be employed a method where an outer peripheral coat material is applied on the outer peripheral portion of the honeycomb structure and dried. The outer peripheral coat material, there may be employed a mixture of inorganic fibers, colloidal silica, clay, SiC particles, an organic binder, a resin balloon, a dispersant, water, and the like. There is no particular limitation on a method for applying the outer peripheral coat material, and an example is a method where it is coated with a rubber spatula with rotating the honeycomb structure on a potter's wheel.

(6) Honeycomb Structure:

A honeycomb structure obtained by a method for manufacturing a honeycomb structure of the present embodiment is provided with a plurality of honeycomb segments extending from one end face to the other end face and the outer peripheral portion surrounding the whole outermost periphery of the honeycomb segments, where a slit shaped gap extending from one end face to the other end face is formed between adjacent honeycomb segments, and the honeycomb segments have partition walls separating and forming a plurality of cells extending from one end face to the other end face to function as fluid passages. In addition, an outer peripheral coat may be formed so as to cover the outer peripheral portion. In addition, it is preferable that plugging portions are formed in opening portions of predetermined cells in one end face and opening portions of the other cells in the other end face to obtain a honeycomb structure (plugged honeycomb structure) where the predetermined cells and the remaining cells are alternately arranged.

The whole shape of the honeycomb structure obtained is not particularly limited and may be a desired shape such as a cylindrical shape and an oval shape. In the case of, for example, a cylindrical shape, as the size of the honeycomb structure, the bottom face diameter is preferably 50 to 450 mm, more preferably 100 to 350 mm. In addition, the length of the honeycomb structure in the central axial direction is preferable 50 to 450 mm, more preferably 100 to 350 mm. The material for the honeycomb structure is preferably ceramic. From the viewpoint of excellent strength and thermal resistance, it is more preferable to use at least one kind selected from the group consisting of silicon carbide, silicon-silicon carbide based composite material, cordierite, mullite, alumina, spinel, silicon carbide-cordierite based composite material, lithium aluminum silicate, aluminum titanate, and iron-chrome-aluminum based alloy. Of these, silicon carbide or silicon-silicon carbide based composite material is particularly preferably used. Since silicon carbide has relatively large thermal expansion coefficient, a honeycomb structure formed with using silicon carbide as the framework sometimes cause a defect due to a thermal shock upon use when a large honeycomb structure is formed. However, since a honeycomb structure obtained by a method for manufacturing a honeycomb structure of the present invention has a structure where a plurality of honeycomb segments are arranged by means of gaps to have a buffer portion disposed in the gap, thermal expansion of silicon carbide is buffered by the buffer portion, and the honeycomb structure can be inhibited from having a defect.

The honeycomb structure obtained by a method for manufacturing a honeycomb structure of the present invention is preferably porous. The opening porosity of the honeycomb structure is 30 to 80%, more preferably 40 to 65%. By adjusting the opening porosity in such a range, pressure loss can be reduced with maintaining strength. When the opening porosity is below 30%, pressure loss may increase. When it is above 80%, strength may decrease, or thermal conductivity may decrease. The opening porosity is measured by Archimedes method.

The honeycomb structure obtained has an average pore diameter of preferably 5 to 50 μm, more preferably 7 to 35 μm. By adjusting the average pore diameter in such a range, particulate matter (PM) can effectively be trapped. When the average pore diameter is below 5 μm, clogging may be caused by the particulate matter (PM). When it is above 50 μm, particulate matter (PM) may pass through the filter without being trapped. The average pore diameter is measured by a mercury porosimeter.

When the material for the obtained honeycomb structure is silicon carbide, the average particle diameter of the silicon carbide particles is preferably 5 to 100 μm. By such an average particle diameter, filter is easily controlled to have suitable porosity and pore size. When the average particle diameter is below 5 μm, the pore diameter becomes too small. When it is above 100 μm, the porosity becomes too high. When the pore diameter is too small, clogging may easily be caused by the particulate matter (PM). When the porosity is too high, pressure loss may increase. The average particle diameter of the raw material is measured according to JIS R 1629.

There is no particular limitation on the cell shape (cell shape in a cross section perpendicular to the central axial direction (direction where the cells extend) of the honeycomb structure) of the honeycomb segment constituting the obtained honeycomb structure, and, examples of the shape include a triangle, a quadrangle, a hexagon, an octagon, a circle, and a combination of these. The partition wall thickness of the honeycomb segment constituting the honeycomb structure is preferably 50 to 2000 μm. When the partition wall thickness is below 50 μm, strength of the honeycomb structure may decrease. When the partition wall thickness is above 2000 μm, pressure loss may increase. Though there is no particular limitation on the cell density of the honeycomb segment constituting the honeycomb structure, it is preferably 0.9 to 311 cells/cm$^2$, more preferably 7.8 to 62 cells/cm$^2$.

It is preferably that the buffer portion constituting the obtained honeycomb structure is disposed so as to fill the whole space of the gap formed between the honeycomb segments. The buffer portion has a thickness of preferably 0.3 to 3.0 mm, more preferably 1.0 to 1.5 mm. When it is below 0.3 mm, thermal shock resistance may decrease. When it is above 3.0 mm, pressure loss may increase.

The thickness of the outer peripheral portion of the obtained honeycomb structure is preferably 0.1 to 4.0 mm, more preferably 0.3 to 1.0 mm. When it is below 0.1 mm, a crack may easily be caused upon outer peripheral coating. When it is above 4.0 mm, pressure may increase. The thickness of the outer peripheral portion means the distance from the outermost periphery of the outer peripheral portion to the nearest cell.

In addition, the thermal expansion coefficient of the honeycomb segment constituting the honeycomb structure is preferable $1\times10^{-6}$/° C. or more, more preferably $2\times10^{-6}$/° C. to $7\times10^{-6}$/° C. According to a method for manufacturing a honeycomb structure of the present invention, even a honeycomb structure having high thermal expansion coefficient can have high thermal shock resistance.

Though the honeycomb segment in the honeycomb structure preferably has a structure as shown in FIG. 1, it may have a structure as the honeycomb structures shown in FIGS. 5 to 11. Each of FIGS. 5 to 11 shows a plan view viewed from one end face side 31, schematically showing a honeycomb structure manufactured by another embodiment of a method for manufacturing a honeycomb structure of the present invention. In order to obtain such a honeycomb structure, it is preferable to manufacture a honeycomb structure by extrusion forming a honeycomb formed article by the use of a die corresponding with each segment structure, followed by firing, filling of the filler, and the like. It is the same as in the aforementioned one embodiment of a method for manufacturing a honeycomb structure of the present invention except for the structure of the die.

In the honeycomb structure 210 shown in FIG. 5, 16 honeycomb segments 33 are separated and formed by the buffer portion 32 with the outer peripheral portion 34 being disposed in the outermost periphery thereof. In addition, as the honeycomb structures 220, 230, 240, 250, 260, and 270 shown in FIGS. 6 to 11, it is preferable that the honeycomb segment having the largest area among the honeycomb segments 33 (33*a*) in contact with the outer peripheral portion 34 has an area larger than that of the honeycomb segment having the smallest area among the remaining honeycomb segments 33 (33*b*) located in the central portion of the honeycomb structure. Since the remaining honeycomb segments 33*b* located in the central portion (honeycomb segments located in the central portion) have higher temperature than the honeycomb segments 33*a* in contact with the outer peripheral portion when particulate matter trapped in the honeycomb structure is combusted and removed, the honeycomb segments located in the central portion can effectively be inhibited from being damaged by locating honeycomb segments each having a small area in the central portion in this manner. Here, "honeycomb segments located in the central portion" mean the remaining honeycomb segments when the honeycomb segments in contact with the outer peripheral portion are removed from the whole honeycomb segments.

In the honeycomb segment 220 shown in FIG. 6, the honeycomb segments 33*b* located in the central portion of one end face 31 have a shape of a small square separated from each other, thereby having an area smaller than that of the honeycomb segments 33*a* in contact with the outer peripheral portion. In the honeycomb structure 230 shown in FIG. 7, the honeycomb segments 33*b* located in the central portion of one end face 31 are separated to have a small fan shape, thereby having an area smaller than that of the honeycomb segments 33*a* in contact with the outer peripheral portion. In the honeycomb structure 240 shown in FIG. 8, the honeycomb segments 33*b* located in the central portion of one end face 31 are separated to have a small rectangular shape, thereby having an area smaller than that of the honeycomb segments 33*a* in contact with the outer peripheral portion. In the honeycomb structure 250 shown in FIG. 9, the honeycomb segments 33*b* located in the central portion of one end face 31 are separated to have a small square shape, thereby having an area smaller than that of the honeycomb segments 33*a* in contact with the outer peripheral portion. In the honeycomb structure 260 shown in FIG. 10, the honeycomb segments 33*b* located in the central portion of one end face 31 are separated to have a small circular shape, thereby having an area smaller than that of the honeycomb segments 33*a* in contact with the outer peripheral portion. The honeycomb structure 270 shown in FIG. 11 has a structure where the buffer portion does not reach the outer peripheral portion in the cross section perpendicular to the central axis to allow cells to be present between the end portions of the buffer portion and the outer peripheral portion. Therefore, the honeycomb segments 33*a* in contact with the outer peripheral portion are formed in a connected state along the outer peripheral portion without being separated from each other. This makes the honeycomb segments 33*b* located in the central portion of one end face 31 smaller than the honeycomb segments 33*a* in contact with the outer peripheral portion. In addition, since the honeycomb structure 270 has a structure where the buffer portion does not reach the outer peripheral portion in the cross section perpendicular to the central axis to allow cells to be present between the end portions of the buffer portion and the outer peripheral portion, a crack is inhibited from being caused in the outer peripheral portion. In addition, in the honeycomb structure 270, the distance from the end portion of the buffer portion to the outer peripheral portion in the cross section perpendicular to the central axis is preferably 0.2 to 4.0 mm, more preferably 0.3 to 1.0 mm. When it is below 0.2 mm, crack resistance of the outer peripheral portion may be deteriorated. When it is above 4.0 mm, pressure loss may increase.

EXAMPLE

Hereinbelow, the present invention will be described more specifically with examples. However, the present invention is by no means limited to these examples.

Example 1

As a ceramic raw material, a SiC powder and a metal Si powder were mixed together at a mass ratio of 80:20. To the mixture were added methyl cellulose and hydroxypropoxymetyl cellulose as forming auxiliaries, starch and water-absorbing resin as pore formers, a surfactant, and water, followed by kneading to obtain kneaded clay with a vacuum kneader.

The columnar kneaded clay obtained above was formed into a cylindrical segment-joined type honeycomb shape. After high frequency dielectric heat-drying, drying was further performed at 120° C. for 2 hours with a hot air dryer, and both the end face was cut at a predetermined amount to obtain a segment-joined type honeycomb formed article. As the segments formation pattern, like the formation pattern of the buffer portion (gap) in a honeycomb structure shown in FIG. 5, three parallel gap portions and other three parallel gap portions perpendicular to the above three parallel gap portions were formed to form 16 honeycomb segments (gap portion pattern: 3×3). Two of the gap portions crossed each other at the right angle in the central portion in an end face of the honeycomb formed article, and the distance between the gaps was 36 mm. The honeycomb formed article had a partition wall thickness of 310 μm, a cell density of 46.5 cells/$cm^2$ (300 cells/$inch^2$), a bottom face diameter of 145 mm, and a length in the central axial direction of 155 mm. In addition, the joining rib thickness was 0.4 mm, the length of the joining ribs in the cross section perpendicular to the central axis was 1.0 mm. The joining ribs had a linear shape perpendicular to the side face of the segment in across-section perpendicular to the central axis. The joining ribs were formed in such a manner that each space between segments might have one joining rib, and the central portion of the side face in the cross section perpendicular to the central axial direction of each segment was connected to that of the adjacent segment.

In the honeycomb formed article obtained above, plugging portions were formed in an end portion of each cell in such a manner that adjacent cells were plugged in mutually opposite end portions so that both the end faces showed a checkerwise pattern. As the filler for plugging, a material similar to that for the honeycomb formed article was used.

After plugging, the plugged honeycomb formed article was dried at 120° C. for five hours by the use of a hot air drier, and then degreasing was performed at about 450° C. for five hours using an atmospheric furnace with a deodorant apparatus in an ambient atmosphere. Then, firing was performed at about 1450° C. for five hours in an Ar inert atmosphere to obtain a plugged porous honeycomb fired article where SiC crystal particles were bonded with Si. The joining ribs had a thickness of 0.4 mm and a length in a cross section perpendicular to the central axis of 1.0 mm. The honeycomb fired article had an average pore diameter of 13 μm and a porosity of 41%. The average pore diameter was measured by a mercury porosimeter, and the porosity was measured by Archimedes method.

In the honeycomb fired article obtained above, the joining ribs were destroyed (vibration destruction) using a vibration jig as shown in FIG. 4A to obtain a joint cancelled honeycomb fired article. As the vibration jig, Kogata Shindo Shikennki (trade name) (meaning small-sized vibration tester) produced by Asahifactory Corporation was used. The vibration time was 10 seconds.

A slurried filler was filled into the gaps of the joint cancelled honeycomb fired article to form a buffer portion. Thus a honeycomb structure was obtained. As the filler, a mixture of aluminosilicate inorganic fibers and SiC particles was used. As the slurry containing the filler, there was used slurry containing 30 parts by mass of water, 30 parts by mass of aluminosilicate inorganic fibers, and 30 parts by mass of SiC particles with respect to 100 parts by mass of the filler. When the slurry was filled in the gap, the honeycomb segments fixed with the vibration jig 21 as shown in FIG. 4A were put in a sealed container, and a polyester based tape (produced by 3M Corporate) was wrapped around the outer periphery lest the slurry should leak from the outer periphery, and then the slurry was pressed into the gaps. The resultant honeycomb structure was measured for regeneration limit value (g/liter) by the following method. In addition, the raw material yield was obtained. The raw material yield is shown as a ratio of the mass of the honeycomb structure after being subjected to processing (rough processing, grinding) of the outer periphery with respect to the mass of the honeycomb structure before being subjected to processing (rough processing, grinding). Since the outer peripheral processing was not performed in a method for manufacturing a honeycomb structure of the Example 1, the raw material yield is 100%. The results are shown in Table 1.

(Regeneration Limit Value)

By using the honeycomb structure as a DPF, the amount of the soot deposition was sequentially increased to perform regeneration (combustion of soot), and the limit where a crack was caused was confirmed. In the first place, a ceramic non-expansion mat was wrapped around the outer periphery of the honeycomb structure as a holding material, and the honeycomb structure was put in a can for canning made of SUS409 to have a canning structure. Then, combustion gas containing soot generated by combusting diesel fuel light oil was allowed to flow into the honeycomb structure from one end face and flow out from the other end face to deposit soot in the honeycomb structure. Then, after the honeycomb structure was cooled down to room temperature, combustion gas having a temperature of 680° C. and containing oxygen at a certain ratio was allowed to flow into the honeycomb structure from one end face. By reducing the combustion gas flow rate when pressure loss of the honeycomb structure decreased, the soot was quickly combusted, and crack generation in the DPF after the combustion was confirmed. This test was repeatedly performed with increasing soot deposition by 0.5 (g/liter) from a soot deposit amount of 4 (g/liter) to confirmation of crack generation. The measurement results of the regeneration limit value shown in Table 1 was obtained by employing the measurement result of the honeycomb structure of Comparative Example 2 (structure having a buffer portion and no joining rib in the formed article) as a standard. That is, each of the values show a value obtained by deducting the measurement result (average of five time (N=5) measurements for the honeycomb structure of Comparative Example 2) of the regeneration limit value (soot amount upon initial crack generation) (g/liter) for the honeycomb structure of Comparative Example 2 from the measurement result (average of five time (N=5) measurements for each honeycomb structure) of the regeneration limit value (soot amount upon initial crack generation) (g/liter) for each honeycomb structure.

TABLE 1

| | Joining rib of formed article | Buffer portion | Regeneration limit value (g/liter) | Raw material yield (%) |
|---|---|---|---|---|
| Example 1 | Present | Present | 0 | 100 |
| Comp. Ex. 1 | Absent | Absent | −2 | 100 |
| Comp. Ex. 2 | Absent | Present | 0 | 74 |

Comparative Example 1

As the ceramic raw material, a SiC power and a metal Si powder were mixed together at a mass ratio of 80:20. To the mixture were added methyl cellulose and hydroxypropoxymetyl cellulose as forming auxiliaries, starch and water-absorbing resin as pore formers, a surfactant, and water, followed by kneading to obtain kneaded clay with a vacuum kneader.

The columnar kneaded clay obtained above was formed into a honeycomb shape. After high frequency dielectric heat-drying, drying was further performed at 120° C. for 2 hours with a hot air dryer, and both the end face was cut at a predetermined amount to obtain a cylindrical honeycomb formed article having a partition wall thickness of 310 μm, a cell density of 46.5 cells/cm$^2$ (300 cells/inch$^2$), a bottom face diameter of 145 mm, and a length in the central axial direction of 155 mm.

In the honeycomb formed article obtained above, plugging portions were formed in an end portion of each cell in such a manner that adjacent cells were plugged in mutually opposite end portions so that both the end faces showed a checkerwise pattern. As the filler for plugging, a material similar to that for the honeycomb formed article was used.

After plugging, the plugged honeycomb formed article was dried at 120° C. for five hours by the use of a hot air drier, and then degreasing was performed at about 450° C. for five hours using an atmospheric furnace with a deodorant apparatus in an ambient atmosphere. Then, firing was performed at about 1450° C. for five hours in an Ar inert atmosphere to obtain a plugged porous honeycomb fired article (honeycomb structure) where SiC crystal particles were bonded with Si. The honeycomb fired article had an average pore diameter of 13 μm and a porosity of 41%. The average pore diameter was measured by a mercury porosimeter, and the porosity was measured by Archimedes method. The aforementioned regeneration limit value (g/liter) and raw material yield were obtained in the same manner as in Example 1. The results are shown in Table 1.

Comparative Example 2

In the same manner as in Comparative Example 1, there were manufactured 16 rectangular parallelepiped honeycomb segments (36 mm×36 mm×155 mm) (partition wall thickness of 310 μm, cell density of 46.5 cells/cm$^2$ (300 cells/inch$^2$). The honeycomb segments were bonded together by the use of a bonding machine to manufacture one large rectangular parallelepiped bonded article (147 mm×147 mm×155 mm). The outer periphery of the rectangular parallelepiped was subjected to rough processing and grinding to obtain a cylindrical honeycomb structure having a bottom face diameter of 145 mm and a length in the central axial direction of 155 mm. The pattern of the end faces of the honeycomb structure was the same as that of the honeycomb structure shown in FIG. 5. In the same manner as in Example 1, the aforementioned regeneration limit value (g/liter) and raw material yield were obtained. The results are shown in Table 1.

Examples 2 to 49

Comparative Examples 3 to 26

The honeycomb structures were obtained in the same manner as in Example 1 except for changing the joining rib thickness (mm), the joining rib shape, the number of the joining ribs between adjacent segments (joining rib number) as shown in Tables 2 and 3. Incidentally, in the case that the joining ribs were not destroyed upon firing, vibration destruction was performed to the honeycomb fired article. In addition, "perpendicular" in the column of "joining rib shape" means a linear state perpendicular to the side faces of the segments in the cross section perpendicular to the central axis of the honeycomb structure (see FIG. 2), “oblique” means a linear state forming an angle of 55° with the side face of the segment in the cross section perpendicular to the central axis of the honeycomb structure (see FIG. 3), “folded” means a shape formed by folding the linear shape at the central portion in the cross section perpendicular to the central axis of the honeycomb structure, where the joining rib and the side face of the segment are joined at an angle of 55° (see FIG. 3), in Tables 2 and 3. In addition, each of the joining ribs was disposed in a position to divide a side face of the segment equally in a cross section perpendicular to the central axis of the honeycomb structure. For example, in the case that the number of the joining rib was one, the joining rib was disposed in the center of the side face of the segment in a cross section perpendicular to the central axis of the honeycomb structure. When the number of the joining ribs was two, the joining ribs were disposed so as to equally divide the side face of the segment into three in the cross section perpendicular to the central axis of the honeycomb structure. In the methods for manufacturing honeycomb structures shown in Examples 2 to 49 and Comparative Examples 3 to 26, shape retainability of a segment-joined type honeycomb formed article, possibility of destruction (vibration destruction) of joining ribs of a honeycomb fired article by vibrations, and possibility of partial destruction of the joining ribs of a honeycomb fired article by firing (firing destruction) were evaluated by the following methods. The results are shown in Tables 2 and 3.

(Shape Retainability)

Regarding the segment-joined type honeycomb formed article, the shape retainability of the formed article with no deformation (bending, being crushed, or the like) is evaluated as good (OK), and the shape retainability of the formed article with any deformation (bending, being crushed, or the like) is evaluated as bad (NG).

(Firing Destruction)

In the firing conditions of Example 1, whether a part of the joining ribs is destroyed or not is evaluated. As the evaluation criterion, when even a part of the joining ribs is destroyed, the destruction is evaluated as good (OK), and, when the joining ribs are not destroyed at all, the destruction is evaluated as bad (NG).

(Vibration Destruction)

The state of destruction in the case of performing vibration destruction of a honeycomb fired article is evaluated. The vibrations are given by Kogata Shindo Shikennki (trade name) (meaning small-sized vibration tester) produced by As Asahifactory Corporation. When the joining ribs are destroyed with no joining rib remains to be connected, the evaluation of good (OK) is given. When even a part of the joining ribs continuously remains, the evaluation of bad (NG) is given as insufficient destruction.

TABLE 2

| | Joining rib thickness (mm) | Joining rib shape | Number of joining rib | Shape retainability | Firing destruction | Vibration destruction |
|---|---|---|---|---|---|---|
| Example 2 | 0.1 | Perpendicular | 1 | OK | OK | OK |
| Example 3 | | | 2 | OK | OK | OK |
| Example 4 | | | 3 | OK | NG | OK |
| Example 5 | | | 4 | OK | NG | OK |
| Example 6 | | Oblique | 1 | OK | OK | OK |
| Example 7 | | | 2 | OK | OK | OK |
| Example 8 | | | 3 | OK | OK | OK |
| Example 9 | | | 4 | OK | NG | OK |
| Example 10 | | Folded | 1 | OK | OK | OK |
| Example 11 | | | 2 | OK | OK | OK |
| Example 12 | | | 3 | OK | OK | OK |
| Example 13 | | | 4 | OK | OK | OK |
| Example 14 | 0.5 | Perpendicular | 1 | OK | OK | OK |
| Example 15 | | | 2 | OK | OK | OK |
| Example 16 | | | 3 | OK | NG | OK |
| Example 17 | | | 4 | OK | NG | OK |
| Example 18 | | Oblique | 1 | OK | OK | OK |
| Example 19 | | | 2 | OK | OK | OK |
| Example 20 | | | 3 | OK | NG | OK |
| Example 21 | | | 4 | OK | NG | OK |
| Example 22 | | Folded | 1 | OK | OK | OK |
| Example 23 | | | 2 | OK | OK | OK |
| Example 24 | | | 3 | OK | OK | OK |
| Example 25 | | | 4 | OK | NG | OK |
| Example 26 | 1.0 | Perpendicular | 1 | OK | NG | OK |
| Example 27 | | | 2 | OK | NG | OK |
| Example 28 | | | 3 | OK | NG | OK |
| Example 29 | | | 4 | OK | NG | OK |
| Example 30 | | Oblique | 1 | OK | NG | OK |
| Example 31 | | | 2 | OK | NG | OK |
| Example 32 | | | 3 | OK | NG | OK |
| Example 33 | | | 4 | OK | NG | OK |
| Example 34 | | Folded | 1 | OK | NG | OK |
| Example 35 | | | 2 | OK | NG | OK |
| Example 36 | | | 3 | OK | NG | OK |
| Example 37 | | | 4 | OK | NG | OK |
| Example 38 | 1.5 | Perpendicular | 1 | OK | NG | OK |
| Example 39 | | | 2 | OK | NG | OK |
| Example 40 | | | 3 | OK | NG | OK |
| Example 41 | | | 4 | OK | NG | OK |
| Example 42 | | Oblique | 1 | OK | NG | OK |
| Example 43 | | | 2 | OK | NG | OK |
| Example 44 | | | 3 | OK | NG | OK |

TABLE 2-continued

| | Joining rib thickness (mm) | Joining rib shape | Number of joining rib | Shape retainability | Firing destruction | Vibration destruction |
|---|---|---|---|---|---|---|
| Example 45 | | | 4 | OK | NG | OK |
| Example 46 | | Folded | 1 | OK | NG | OK |
| Example 47 | | | 2 | OK | NG | OK |
| Example 48 | | | 3 | OK | NG | OK |
| Example 49 | | | 4 | OK | NG | OK |

TABLE 3

| | Joining rib thickness (mm) | Joining rib shape | Number of joining rib | Shape retainability | Firing destruction | Vibration destruction |
|---|---|---|---|---|---|---|
| Comp. Ex. 3 | 0.05 | PerpenDicular | 1 | NG | OK | OK |
| Comp. Ex. 4 | | | 2 | NG | OK | OK |
| Comp. Ex. 5 | | | 3 | NG | NG | OK |
| Comp. Ex. 6 | | | 4 | NG | NG | OK |
| Comp. Ex. 7 | | Oblique | 1 | NG | OK | OK |
| Comp. Ex. 8 | | | 2 | NG | OK | OK |
| Comp. Ex. 9 | | | 3 | NG | OK | OK |
| Comp. Ex. 10 | | | 4 | NG | NG | OK |
| Comp. Ex. 11 | | Folded | 1 | NG | OK | OK |
| Comp. Ex. 12 | | | 2 | NG | OK | OK |
| Comp. Ex. 13 | | | 3 | NG | OK | OK |
| Comp. Ex. 14 | | | 4 | NG | OK | OK |
| Comp. Ex. 15 | 2.0 | PerpenDicular | 1 | OK | NG | NG |
| Comp. Ex. 16 | | | 2 | OK | NG | NG |
| Comp. Ex. 17 | | | 3 | OK | NG | NG |
| Comp. Ex. 18 | | | 4 | OK | NG | NG |
| Comp. Ex. 19 | | Oblique | 1 | OK | NG | NG |
| Comp. Ex. 20 | | | 2 | OK | NG | NG |
| Comp. Ex. 21 | | | 3 | OK | NG | NG |
| Comp. Ex. 22 | | | 4 | OK | NG | NG |
| Comp. Ex. 23 | | Folded | 1 | OK | NG | NG |
| Comp. Ex. 24 | | | 2 | OK | NG | NG |
| Comp. Ex. 25 | | | 3 | OK | NG | NG |
| Comp. Ex. 26 | | | 4 | OK | NG | NG |

From Table 1, it can be understood that the regeneration limit value of the honeycomb structure obtained by a method for manufacturing a honeycomb structure of Example 1 is better than that of a honeycomb structure obtained by a method for manufacturing a honeycomb structure of Comparative Example 1. In addition, the raw material yield in a method for manufacturing a honeycomb structure of Example 1 is much better than that in a method for manufacturing a honeycomb structure of Comparative Example 2, where rough processing and grinding were performed after a plurality of segments were joined together.

From Tables 2 and 3, it can be understood that, when the joining rib thickness is below 0.1 mm (Comparative Examples 3 to 14), shape retainability deteriorates, and that, when the joining rib thickness is above 2.0 mm (Comparative Examples 15 to 26), the joining rib cannot be destroyed. In addition, regarding the joining rib shape, it can be understood that an “oblique” joining rib can be destroyed more easily than a ‘perpendicular’ joining rib and that a “folded” joining rib can be destroyed more easily than an “oblique” joining rib. It is also understood that the destruction of the joining ribs become harder as the number of the joining ribs increases.

A method for manufacturing a honeycomb structure of the present invention can be used in order to effectively manufacture a honeycomb structure capable of being suitably used as a carrier for a catalyst apparatus or a filter used for environmental measure, recovery of a specific substance in various fields such as chemistry, electric power, and iron and steel.

What is claimed is:

1. A method for manufacturing a honeycomb structure, comprising the steps of:

subjecting a forming raw material to extrusion forming to obtain a segment-joined type honeycomb formed article provided with a plurality of honeycomb segments extending from one end face to another end face and an outer peripheral portion surrounding a whole outermost periphery of the plurality of honeycomb segments;

forming a slit-shaped gap extending from one end face to the other end face between adjacent segments, adjacent honeycomb segments are joined by a belt-like joining rib extending from one end face to the other end face and having a thickness of 0.1 to 1.5 mm, and the honeycomb segments have partition walls separating and forming a plurality of cells extending from one end face to the other end face and functioning as fluid passages, wherein the joining rib is obliquely joined or folded;

firing the honeycomb formed article to form a honeycomb fired article;

destroying the joining rib in the honeycomb fired article; and forming a buffer portion by filling a bonding material in the gap.

2. A method for manufacturing a honeycomb structure according to claim 1, wherein plugging portions are formed in opening end portions on one side of predetermined cells and opening end portions on another side of remaining cells of each of the honeycomb segments of the honeycomb formed article, followed by firing the honeycomb segments.

3. A method for manufacturing a honeycomb structure according to claim 2, wherein a part of the joining rib is destroyed with firing the honeycomb formed article, and a remaining part of the joining rib of the honeycomb fired article is destroyed.

4. A method for manufacturing a honeycomb structure according to claim 3, wherein the honeycomb segment after firing has a thermal expansion coefficient of $1\times10^{-6}$/° C. or more.

5. A method for manufacturing a honeycomb structure according to claim 2, wherein the honeycomb segment after firing has a thermal expansion coefficient of $1\times10^{-6}$/° C. or more.

6. A method for manufacturing a honeycomb structure according to claim 1, wherein, after the honeycomb formed article is fired, plugging portions are formed in opening end portions on one side of predetermined cells and opening end portions on another side of the remaining cells of each of the honeycomb segments of the honeycomb fired article.

7. A method for manufacturing a honeycomb structure according to claim 6, wherein a part of the joining rib is destroyed with firing the honeycomb formed article, and a remaining part of the joining rib of the honeycomb fired article is destroyed.

8. A method for manufacturing a honeycomb structure according to claim 7, wherein the honeycomb segment after firing has a thermal expansion coefficient of $1\times10^{-6}$/° C. or more.

9. A method for manufacturing a honeycomb structure according to claim 6, wherein the honeycomb segment after firing has a thermal expansion coefficient of $1\times10^{-6}$/° C. or more.

10. A method for manufacturing a honeycomb structure according to claim 1, wherein a part of the joining rib is destroyed with firing the honeycomb formed article, and a remaining part of the joining rib of the honeycomb fired article is destroyed.

11. A method for manufacturing a honeycomb structure according to claim 10, wherein honeycomb segment after firing has a thermal expansion coefficient of $1\times10^{-6}$/° C. or more.

12. A method for manufacturing a honeycomb structure according to claim 1, wherein the honeycomb segment after firing has a thermal expansion coefficient of $1\times10^{-6}$/° C. or more.

* * * * *